Figure 1:
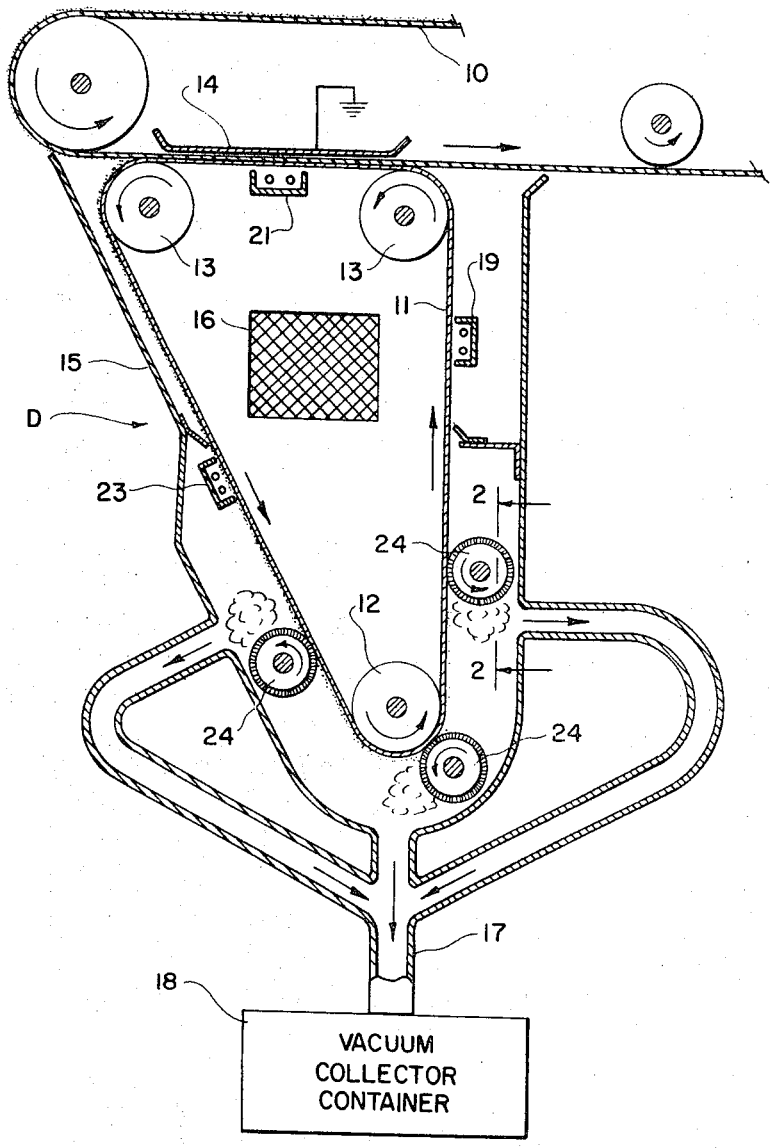
Figure 2:
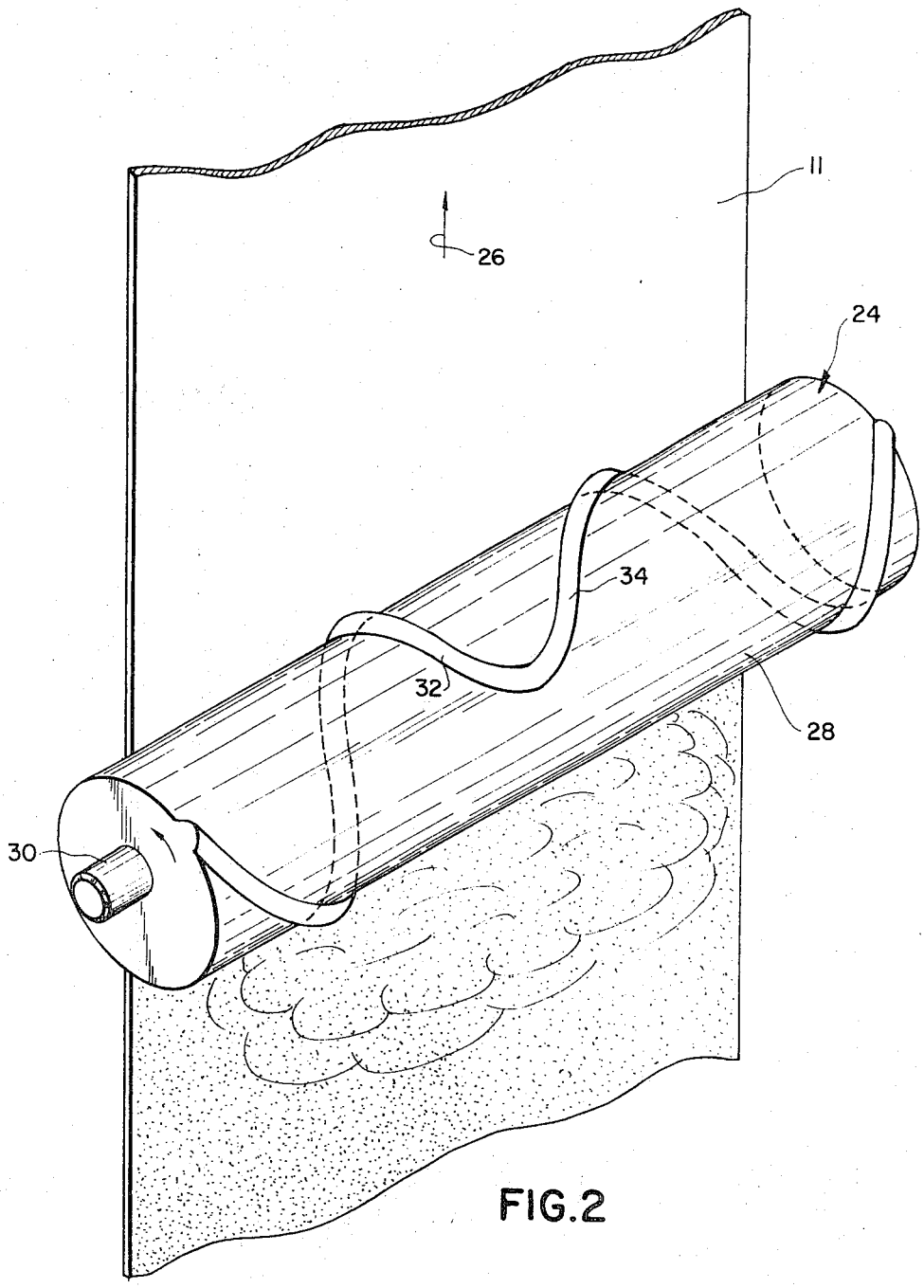

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 366

T879,005
CLEANING ELEMENT

Richard K. Leinbach and Donald D. Leenhouts, both of 901 Elmgrove Road, Rochester, N.Y. 14650

Filed Mar. 2, 1970, Ser. No. 15,663
Int. Cl. A46b *15/00*
U.S. Cl. 15—256.5
2 Sheets Drawing. 8 Pages Specification

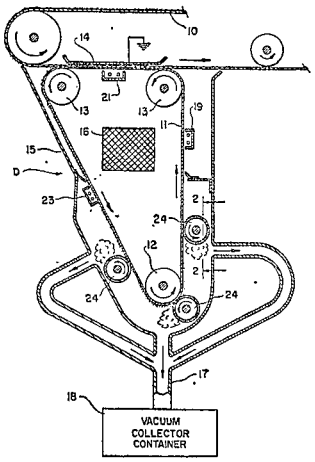

A rotatable cleaning element such as a brush or beater bar for removing residual toner particles from a cleaning web is provided. The removed toner particles create a cloud within a housing through which the cleaning web moves along an endless path. A vacuum is applied to the housing to create a moving airstream for removing the cloud of toner particles from the housing. This cleaning brush comprises a cylindrical roller having a raised cleaning surface thereon made of material in the form of a right-hand helix extending from a midpoint on the surface of the roller toward one end thereof and a left-hand helix extending from a midpoint toward the opposite end of the roller. This material can be a nap or brush material of well known construction for rubbing or beating against the cleaning web or a raised rib or lobe on the roller. The cleaning brush is rotated in a direction so that the right and left-hand helical configuration causes the cloud of toner particles to be directed toward the center of the cleaning web so that toner does not tend to collect on side walls of the housing.

Oct. 13, 1970 R. K. LEINBACH ET AL T879,005

CLEANING ELEMENT

Filed March 2, 1970 2 Sheets-Sheet 1

RICHARD K. LEINBACH
DONALD D. LEENHOUTS
INVENTORS

BY Gary D. Fields
Robert W Hampton
ATTORNEYS

CLEANING ELEMENT

Filed March 2, 1970 2 Sheets-Sheet 2

RICHARD K. LEINBACH
DONALD D. LEENHOUTS
INVENTORS
BY Gary D. Fields
Robert W Hampton
ATTORNEYS